US007466772B2

(12) United States Patent
Bertram

(10) Patent No.: US 7,466,772 B2
(45) Date of Patent: *Dec. 16, 2008

(54) DECODING CODED DATA STREAMS

(75) Inventor: Felix Uwe Bertram, Rellingen (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/983,552

(22) Filed: Nov. 9, 2007

(65) Prior Publication Data

US 2008/0069272 A1 Mar. 20, 2008

Related U.S. Application Data

(63) Continuation of application No. 10/698,729, filed on Oct. 30, 2003, now Pat. No. 7,310,390.

(51) Int. Cl.
  *H03D 1/00* (2006.01)
  *H04L 27/06* (2006.01)
(52) U.S. Cl. ...................... 375/340; 375/333
(58) Field of Classification Search ................. 375/324, 375/333, 340, 359–361
  See application file for complete search history.

(56) References Cited

U.S. PATENT DOCUMENTS

| 3,982,195 | A | * | 9/1976 | Turner ................... 329/310 |
| 4,267,595 | A | * | 5/1981 | Hernandez .............. 375/342 |
| 4,270,183 | A | | 5/1981 | Robinson et al. |
| 4,876,700 | A | * | 10/1989 | Grindahl ................ 375/333 |
| 5,001,728 | A | * | 3/1991 | Füldner ................. 375/328 |
| 5,168,511 | A | * | 12/1992 | Boles .................... 375/328 |
| 5,200,980 | A | * | 4/1993 | Briddell ................. 375/333 |
| 5,592,658 | A | | 1/1997 | Noam |
| 5,745,530 | A | | 4/1998 | Baek et al. |
| 5,799,043 | A | | 8/1998 | Chang et al. |
| 5,958,027 | A | | 9/1999 | Gulick |
| 6,008,746 | A | * | 12/1999 | White ..................... 341/70 |
| 6,034,620 | A | | 3/2000 | Ikka |
| 6,249,155 | B1 | | 6/2001 | Hartman et al. |
| 6,279,058 | B1 | | 8/2001 | Gulick |
| 6,359,476 | B2 | | 3/2002 | Hartman et al. |
| 6,442,200 | B1 | * | 8/2002 | Fukui ..................... 375/239 |
| 6,603,831 | B1 | | 8/2003 | Silveira |
| 6,647,502 | B1 | | 11/2003 | Ohmori |
| 6,778,621 | B1 | | 8/2004 | Wilson et al. |
| 6,970,500 | B1 | | 11/2005 | Sanders |
| 6,973,148 | B2 | | 12/2005 | Berens et al. |
| 6,977,973 | B1 | * | 12/2005 | Wiggins .................. 375/333 |
| 6,990,598 | B2 | | 1/2006 | Sherburne, Jr. |
| 7,133,482 | B2 | * | 11/2006 | Poletto et al. ........... 375/361 |
| 2001/0030556 | A1 | | 10/2001 | Hartman et al. |
| 2002/0064248 | A1 | | 5/2002 | Berens et al. |
| 2003/0227987 | A1 | * | 12/2003 | Poletto et al. ........... 375/360 |

* cited by examiner

*Primary Examiner*—Jean B Corrielus
(74) *Attorney, Agent, or Firm*—Blakely, Sokoloff, Taylor & Zafman LLP

(57) ABSTRACT

A method of decoding, in one particular embodiment, an IEC 60958 biphase coded data stream comprising determining the maximum period in the data stream without a transition; determining a first threshold corresponding to a period of time less than the maximum period and greater than the data bit period; determining whether a considered transition corresponds to a data bit or a preamble based on the time between the considered transition and a preceding transition compared with said first threshold; and if the considered transition corresponds to a data bit, determining the data bit based on the considered transition and the preceding considered transition.

22 Claims, 12 Drawing Sheets

DECODING CODED DATA STREAMS

The present application is a Continuation of U.S. application Ser. No. 10/698,729 filed Oct. 30, 2003, now issued as U.S. Pat. No. 7,310,390.

BACKGROUND

The present invention relates to a method and apparatus for decoding coded data streams, including biphase coded data streams such as, similar to or compatible with the IEC 60958 and Japanese EIAJ CP-340 1987-9 standards. AES-EBU (Audio Engineering Society-European Broadcasting Union) and SPDIF (Sony Philips Digital Interconnect Format) are both implementations of the IEC 60958 standard.

Each of these standards is now widely used for digital audio transmission. These standards were developed following the introduction of the compact disc player in which digital audio data signals were initially retained inside the player cabinet and were converted to analogue signals before leaving the cabinet. However, audio (and now video) signals are increasingly maintained in their digital format for as long as possible to maintain digital quality. Thus, it is now common for digital audio and video data source devices, such as music synthesisers and CD, DVD, DAT and MP3 players to output the audio and video data in digital form to subsequent audio and video logic circuits. These logic circuits may be implemented in separate devices, such as desktop computers, amplifiers and televisions. The IEC 60958 standard was developed to aid transfer of digital signals between devices and has now effectively become the worldwide standard.

In common with other standards, the IEC 60958 standard uses biphase coding, such as biphase Manchester coding. In biphase coding, a data stream is combined with a clock on a single channel such that there are up to two transitions on the line for each data bit conveyed. Specifically, with biphase Manchester coding, there is a line transition at the end of each data bit period and a central transition if the bit is a '1'.

An example of biphase coding is shown in FIG. 1. Specifically, FIG. 1 shows an uncoded data signal in the middle, the data signal including a plurality of data bits. The clock for this data signal is shown above the data signal. The clock toggles or transitions from lo to hi at the start of each bit in the data signal. Thus, the clock includes a rising edge for every data bit. The corresponding biphase coded data is shown at the bottom of FIG. 1. Every data bit of the data signal is represented as two states in the biphase coded data, which each form a cell. Thus, the length of two cells is equal to the length of a data bit. Accordingly, where all flip-flops toggle on the same clock edge (for example, the rising edge), the clock required to produce the coded signal must have twice the frequency of the clock shown at the top of FIG. 1. As an alternative, it would be possible to use both clock edges to achieve the same effect. Such a clock is termed double data rate or double pumped. What is important, is that the clock provides two triggering events per data bit.

Since there is a transition at the end of each bit period in the biphase coded signal, the logical level at the start of a data bit is always inverted to the level at the end of the previous bit. In other words, the first cell corresponding to a bit in the biphase coded signal will always have a different state to that of the second cell of the preceding bit. Moreover, since there is a central transition if the bit is a '1', the level at the end of a bit is equal (a '0' transmitted) or inverted (a '1' transmitted) to the start of the bit. This is sometimes termed biphase mark coding (BMC).

In the IEC 60958 standard, each audio frame contains two sub-frames. Each subframe contains one audio sample word. Such an audio sample word is a 32 bit word. In the IEC 60958 standard, the 32 bits in a subframe may be used as follows:

| Bit | Meaning |
| --- | --- |
| 0-3 | Preamble |
| 4-7 | Auxiliary audio data bits |
| 8-27 | Sample |
| 28 | Validity |
| 29 | Subcode data |
| 30 | Channel status information |
| 31 | Parity |

Depending on the technology, different sample sizes are used in subframes. Thus, a 24 bit sample using bits 4-27 can be obtained. In contrast, a CD player uses only 16 bits so only bits 13(LSB)-27(MSB) are used. Bits 4-12 are set to '0'. However, it should be remembered that, when encoded, each '0' bit includes a transition.

The number of subframes that is used depends on the number of channels that is transmitted, although no scheme is yet known that uses more than two subframes. If two channels are transmitted, then each frame contains two subframes and each of the two subframes contains a sample. The two subframe samples are played simultaneously on the respective channels. A block contains 192 subframes, numbered 0-191.

The sampling frequency (fs) is the frequency of samples in the data signal. Since two 32 words are transmitted for each sample, 64 bits are transmitted for each sample. Accordingly, the frequency of the clock shown in FIG. 1 is 64 times the sampling frequency (64 fs). Since two cells of are provided in the biphase coded signal for each data bit, the biphase coded signal clock frequency is 128 times the sampling frequency (128 fs).

Different technologies use different sampling frequencies. For example, for CD fs=44.1 kHz and for DAT fs=48 kHz. Accordingly, for CD 128 fs=5.6 MHz and for DAT fs=6.1 MHz. Thus, a block containing 192 subframes typically accounts for approximately 4 ms of audio (192/44.1 kHz=4.3 ms and 192/48 kHz=4 ms).

There are several technologies available for implementing digital to analogue converters (DACs), including R-2R ladders and constant calibration DACs. R-2R ladders are created from a network of precision resistors. Constant calibration DACs generate an output voltage by combining the charges of several capacitors, which are constantly re-calibrated. All DAC technologies have in common that they are expensive to manufacture. Accordingly, typical audio converters include DACs with less physical resolution than the 24 bit words containing the audio samples. Thus, to achieve the required resolution, an oversampling technique is used. In other words, the data is sampled at a multiple of the required sampling frequency fs and then filtered. These oversampling mechanisms are driven using a faster clock—that is, one running at a higher frequency. The audio clock of most audio converters therefore runs at 256 times the sampling frequency (256 fs), although higher frequencies such as 384 fs are known. As the received IEC 60958 signal carries the sampling clock fs in itself, the oversampling audio clocks are phase locked to the frequencies shown in FIG. 1.

As noted above, the first four bits (0-3) in each subframe form a preamble or header. The preamble thus contains eight cells and feasibly up to 8 transitions. The preamble is used for synchronisation and does not carry any audio data. Consequently, it does not use biphase coding. Thus, the preamble is capable of including more than two 0s or 1s in succession and always does so at the start to distinguish itself from the rest of the subframe. In practice then, the preamble never contains the 8 possible transitions.

In the IEC 60958 standard, the preamble forms one of three allowed synchronisation patterns, as follows:

|  | Cell Order | |
| --- | --- | --- |
| Preamble | Last Cell '0' | Last Cell '1' |
| B | 11101000 | 00010111 |
| M | 11100010 | 00011101 |
| W | 11100100 | 00011011 |

Preamble B marks a word containing data for channel A (left channel) at the start of the data block; preamble M marks a word containing data for channel A that is not at the start of the data block; and preamble W marks a word containing data for channel B (right channel), or any other channel except A.

Typical methods of decoding biphase coded data streams involve the use of analogue or digital phase locked loops (PLLs) to recover the biphase coded signal clock, which is at twice the bit rate or 128 fs. Typically, both types of PLL include, for example, a voltage controlled oscillator (VCO) generating a clock having approximately 128 fs. Transitions in the data stream are detected and low frequency transitions are filtered out so that only transitions at the approximate sampling frequency are retained. These transitions are used to adjust the phase and frequency of the clock generated by the PLL so that it matches the data clock of the written data. Thus, if the phase or frequency of written data changes, the PLL recognises these changes and adjusts accordingly. Once this data clock is recovered, it can be used to determine whether a transition has occurred between PLL clock cycles and hence to recover the proper stream of 0s and 1s in the encoded data. The encoded data can then be decoded using a reverse algorithm to the coding algorithm.

However, analogue PLLs suffer the drawback that they cannot easily be integrated with digital logic in typical application specific integrated circuits (ASICs), gate arrays and field programmable gate arrays (FPGAs). Digital solutions are therefore preferred. Unfortunately, digital PLLs also suffer a number of drawbacks, as discussed below.

The recovered IEC 60958 128 fs data clock rate is phase locked to the sampling frequency fs carried by the IEC 60958 signal. In addition, the oversampling frequency 256 fs for use in the audio converter must be created from the recovered IEC 60958 data clock. Thus, any jitter in the sampling frequency fs will degrade audio performance since aperture jitter (variations in the window during which a signal is sampled), bit resolution and signal-to-noise are inter-related. Clock jitter therefore audibly (or visibly) degrades the output of the audio (or video) output device. Typically, the AES/EBU standard for serial digital audio uses a 163 ns clock rate (or 6.1 MHz) and allows up to ±20 ns of jitter in the signal (equivalent to 50 MHz). Other standards are more stringent. Consequently, the jitter on the PLL data clock must be minimised to preserve audio fidelity. In other words, the window in which each rising edge of the clock transition may be generated must be minimised.

Improvements to biphase and other signal decoding therefore present a number of problems. First, it is desired to create a 256 fs clock with very little jitter to feed the audio (or other) system. In addition, it is desired to use the same clock to decode the incoming biphase coded data stream, such as an IEC 60958 or other coded signal, since this signal is phase locked with the signal output to the audio system. Thus, it must be possible to adjust this clock fast enough to track the phase jitter present in the biphase coded data stream, so that the bits can be consistently and accurately decoded. Moreover, the phase of the PLL must be set so that the centre of each cell in the biphase coded data stream is sampled. A fast PLL capable of tracking the IEC 60958 signal will have a wide lock range, but create a lot of jitter. In contrast, a stable PLL with low jitter will have a narrow lock range, but may not be fast enough to track the incoming IEC 60958 signal.

The usual approach for implementing the PLL clock would entail providing a fast free-running clock; using a programmable divider with a very high resolution; adjusting the programmable divider so that it follows or tracks the preambles; and using the (appropriately divided) output of the divider to decode the cells.

Unfortunately, there are several problems with this approach. In particular, this approach requires the phase reference to be determined by detecting preambles using a circuit running from the free-running clock. This means that the minimum obtainable error in the phase reference is dependent on the frequency of the free-running clock. More specifically, the minimum obtainable error decreases as the speed of the free-running clock increases. This phase reference error will effect the accuracy of the PLL and hence its ability to sample the centre of each cell in the biphase coded data stream. Thus, the accuracy of the clock generated by the PLL is limited by the accuracy of the phase reference and hence by the frequency of the free-running clock.

In addition, a digital PLL is a regulator, which controls the frequency of a programmable clock generator depending on the output of a phase comparator, which compares the phase of the generated signal with a phase reference. In this case, the phase reference is the phase of the detected preambles in the biphase coded signal. However, a simple P-type regulator will not be capable of tracking the digital signal with the required accuracy for this application.

It might be feasible to obtain the required accuracy using a PID-type regulator. Unfortunately, however, PID-type regulators introduce additional problems. In particular, PID-type regulators include arithmetic to control the clock signal. However, such arithmetic is slow and large when implemented in digital logic. In addition, there is a fixed relationship between the lock range and the accuracy of PLLs, which is dependent on the loop filter of the PLL. Thus, it is difficult to track different frequencies (for example, 44.1 kHz, 88.2 kHz etc for CD; and 48 kHz, 96 kHz etc for DAT) using a single set of parameters. Switching between different parameter sets requires further circuitry and is costly. Accordingly, implementation of the PLL using a PID-type regulator would be difficult at the required clock frequencies.

In summary, depending on the technology in which the apparatus is to be implemented, a PLL with the required clock speeds and accuracy is difficult to implement in a cost effective manner.

SUMMARY

According to certain embodiments of the present invention, there is provided a method of decoding a coded data stream of a plurality of cells, the uncoded data stream comprising a plurality of segments each formed of a preamble of fixed length and a series of data bits, wherein:

the coded data stream includes at least two cells and one transition for each data bit and a portion without a transition at the beginning of each preamble, the said portion having the maximum period in the coded data stream without a transition and being longer than a bit period, the method characterised by:

detecting transitions in the coded data stream;

determining the maximum period in the data stream without a transition;

determining a first threshold corresponding to a period of time less than the maximum period and greater than the data bit period;

determining whether a considered transition corresponds to a data bit or a preamble based on the time between the considered transition and a preceding transition compared with said first threshold; and if the considered transition corresponds to a data bit, determining the data bit based on the considered transition and the preceding considered transition.

According to another aspect of the present invention, there is provided an apparatus for decoding a coded data stream of a plurality of cells, the uncoded data stream comprising a plurality of segments each formed of a preamble of fixed length and a series of data bits, wherein:

the coded data stream includes at least two cells and one transition for each data bit and a portion without a transition at the beginning of each preamble, the said portion having the maximum period in the coded data stream without a transition and being longer than a bit period, the method characterised by:

a detector for detecting transitions in the coded data stream;

a timer for determining the time between adjacent transitions;

logic for determining the maximum period in the data stream without a transition and for determining a first threshold corresponding to a period of time less than the maximum period and greater than the data bit period; and a filter for determining whether a considered transition corresponds to a data bit or a preamble based on the time between the considered transition and a preceding transition compared with said first threshold and, if the considered transition corresponds to a data bit, determining the data bit based on the considered transition and the preceding considered transition.

According to yet another aspect of the present invention, there is provided a method of decoding a biphase coded data stream comprising a plurality of words formed of a plurality of cells of equal period, the cells in each word forming a preamble and a series of data bits, wherein:

the preamble comprises a predetermined plurality of cells and each data bit comprises two cells;

there is a transition between cells of adjacent data bits;

there is a transition between a data bit cell and an adjacent preamble cell; and a predetermined maximum period in the data stream without a transition is formed at the beginning of the preamble, the maximum period being longer than the cell period, the method characterised by:

detecting transitions in the data stream;

determining a threshold corresponding to the maximum period in the data stream without a transition;

determining whether a transition corresponds to a data bit cell or the preamble based on the time between the transition and a preceding transition compared to the threshold; and if the transition corresponds to a data bit cell, determining the data bit represented by the data bit cell based on the transition and the transition of a cell of an adjacent data bit.

According to a still further aspect of the present invention, there is provided an apparatus for decoding a biphase coded data stream comprising a plurality of words formed of a plurality of cells of equal period, the cells in each word forming a preamble and a series of data bits, wherein:

the preamble comprises a predetermined plurality of cells and each data bit comprises two cells;

there is a transition between cells of adjacent data bits;

there is a transition between a data bit cell and an adjacent preamble cell; and a predetermined maximum period in the data stream without a transition is formed at the beginning of the preamble, the maximum period being longer than the cell period, the apparatus comprising:

a detector for detecting transitions in the data stream;

logic for determining a threshold corresponding to the maximum period in the data stream without a transition; and a filter for determining whether a transition corresponds to a data bit cell or the preamble based on the time between the transition and a preceding transition compared to the threshold and, if the transition corresponds to a data bit cell, for determining the data bit represented by the data bit cell based on the transition and the transition of a cell of an adjacent data bit.

BRIEF DESCRIPTION OF THE DRAWINGS

Embodiments of the present invention will now be described by way of further example only and with reference to the accompanying drawings, in which.

DETAILED DESCRIPTION

Figure 1:
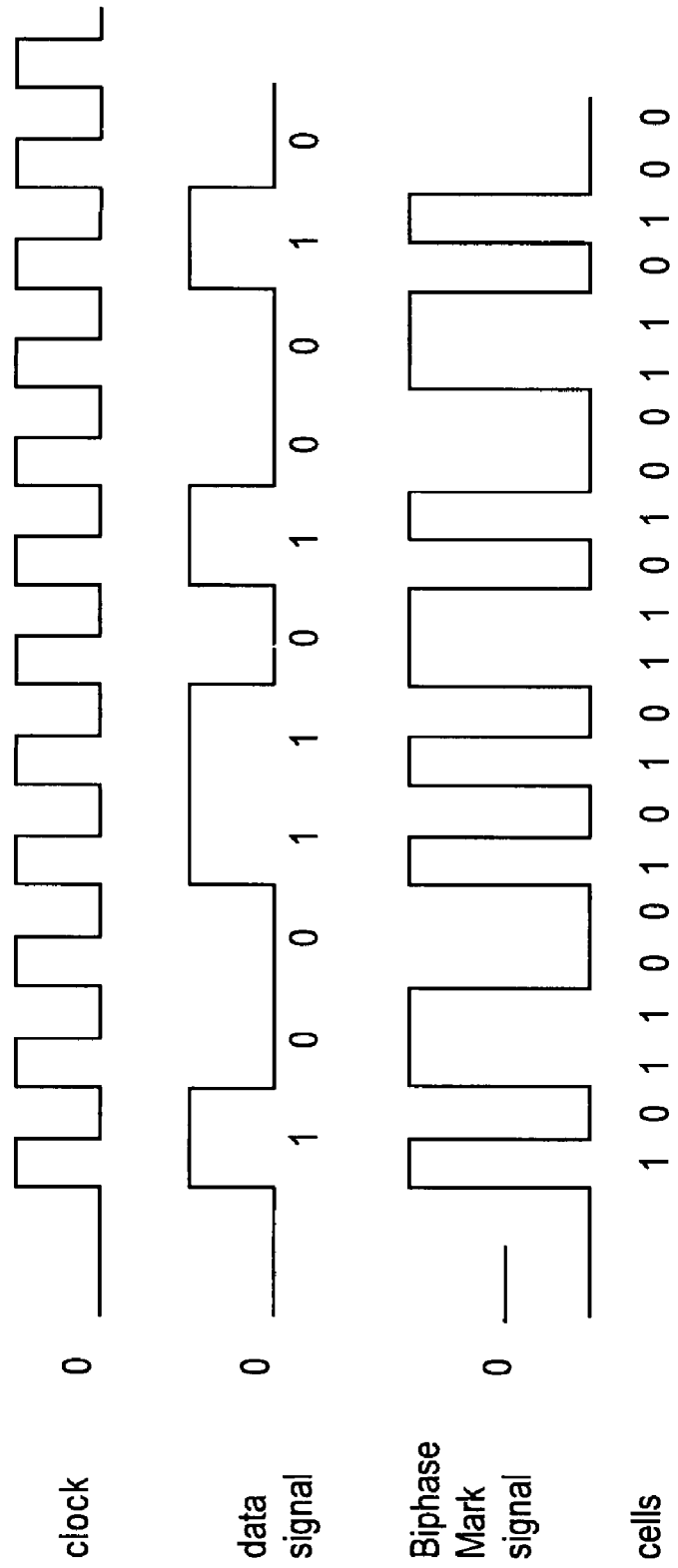
FIG. 1 illustrates the principles of biphase coding.
Figure 2:
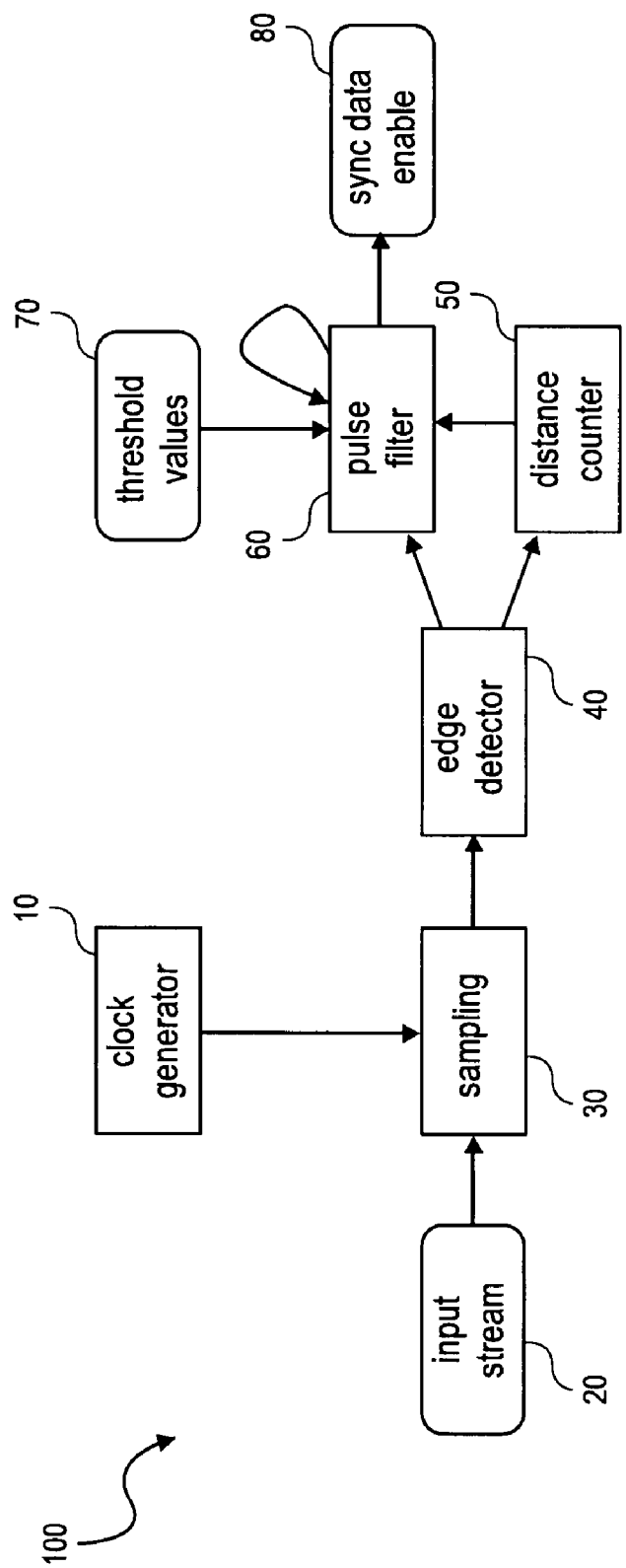
FIG. 2 is a schematic view of a decoding apparatus according to an embodiment of the present invention.

As shown in FIG. 2, the data stream decoder 100 comprises a clock generator 10, a sampler 30, an edge detector 40, a distance counter 50 and a pulse filter 60. The clock generator 10 generates a free running clock with a clock frequency that is significantly higher than the sampling frequency fs. For example the clock generator 10 may generate a clock with a frequency of 96 MHz for SPDIF signals. The free running clock is used to detect the state of the incoming data stream 20 using sampler 30. The synchronous edge detector 40 creates a pulse whenever the signal of the incoming data stream toggles—that is, whenever a transition is detected. Accordingly, in contrast to the prior art, a PLL is not used to detect transitions or their timing.

Pulses from the edge detector 40 are provided to the distance counter 50 and the pulse filter 60 separately. The distance counter measures the distance (or more correctly, the time) between pulses output by the edge detector 40 and, consequently, the distance or time between transitions in the incoming encoded data stream 20. From this, the maximum distance dmax between two pulses and hence the maximum distance or time between transitions in the incoming data signal 20 is determined. Based on the characteristics of the encoded data stream, this distance dmax is used to determine a number of thresholds for decoding the data stream 20.

More specifically, for biphase coding the maximum distance dmax between two pulses output by the edge detector always occurs at the start of the preamble coding and corresponds with three cells each having the same state. This is clear from the three allowed synchronisation patterns B, M and W, which always commence with 000 or 111, depending on the state of the preceding cell. The end of the preamble is always five cells after the end of the third cell in the preamble (the preamble includes a total of eight cells) and is always followed by a cell corresponding to an uncoded data bit. Finally, every two biphase coded cells correspond to an uncoded data bit.

Thus, the decoder 100 needs to determine two or more of the following distances, with reference to the sampling frequency, in order to set appropriate thresholds:

- 2×(128 fs): the distance between the beginning of the first cell and the end of the second cell corresponding to a data bit—that is, the distance taken up by two cells. This distance and the corresponding threshold (hereinafter the 2cell threshold) is used to skip the transition in the middle of each '1' bit and to jump from bit to bit;
- 3×(128 fs): the distance taken up by three cells. This distance and the corresponding threshold (hereinafter the 3cell threshold) is used to detect the preamble coding which violates the biphase coding scheme since it includes more than two 0s or 1s in a row at the start; and
- 5×(128 fs): the distance taken up by five cells. This distance and the corresponding threshold (hereinafter the 5cell threshold) is used to find the end of the preamble after detecting the 3×(128 fs) protocol violation.

Since one cell length=dmax/3, appropriate threshold values may be calculated efficiently using simple digital logic without the use of multipliers as follows:

2cell threshold=1.5×cell length=0.5 dmax

3cell threshold=2.25×cell length=0.75 dmax

5cell threshold=4.5×cell length=1.5 dmax

Once these thresholds have been calculated, the distance counter 50 and the pulse filter 60 can be used to decode the data stream.

In common with the calculation of the thresholds, the functionality of the pulse filter 60 is based on the encoding of the incoming data stream, which (as explained above) defines a maximum distance between transitions for a data bit. To achieve the required functionality, the pulse filter 60 may be constructed as a simple state machine, although other constructions will be obvious to persons skilled in the art. In particular, the pulse filter 60 can be implemented using software.

Figure 3:
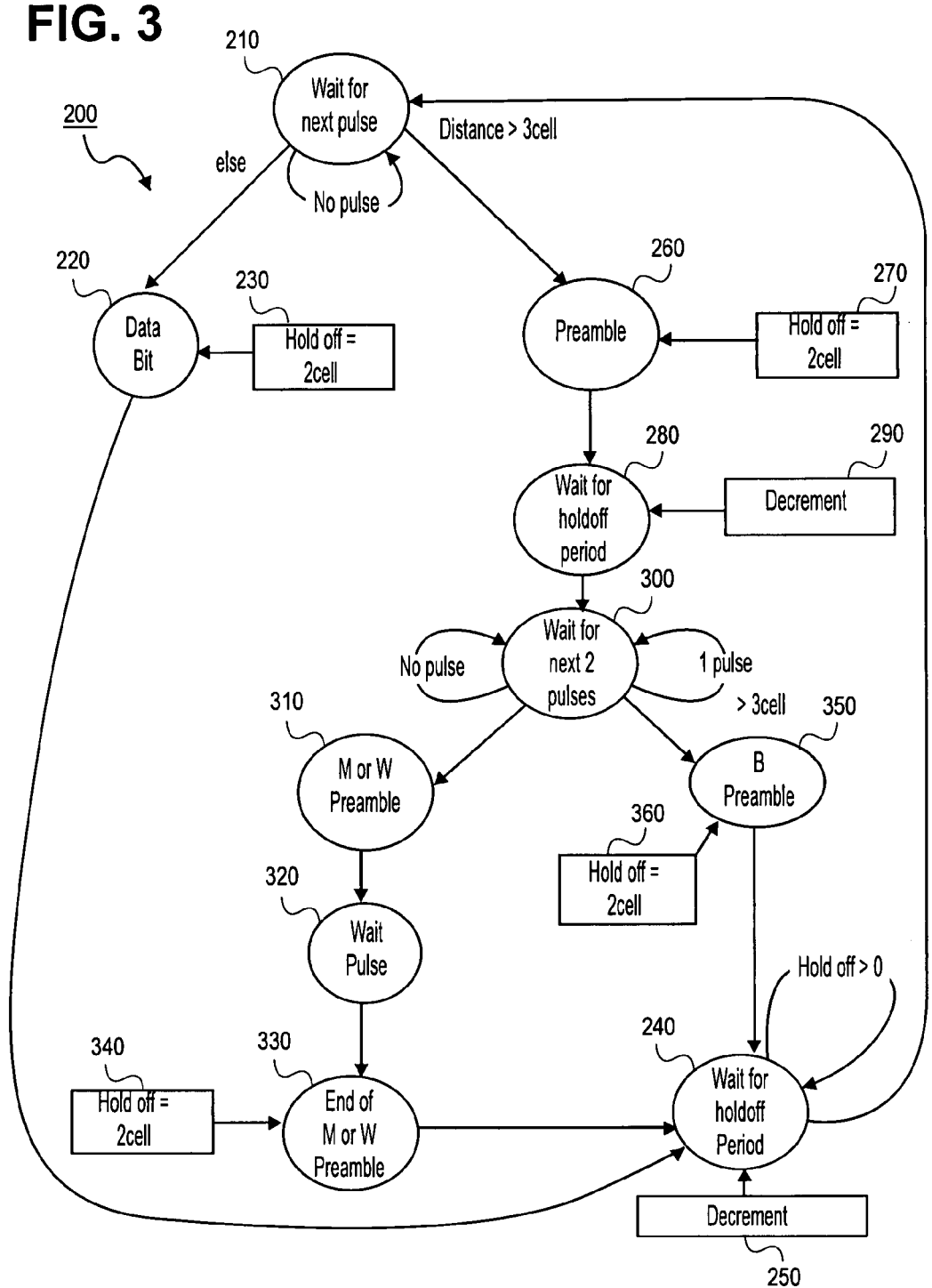
FIG. 3 is a state machine diagram illustrating a decoding method and apparatus according to an embodiment of the present invention.

One embodiment of the process carried out by a suitable pulse filter state machine 200 for biphase decoding is shown in FIG. 3. As shown in FIG. 3, the state machine 200 defines "holdoff" periods during which transition pulses from the edge detector 40 are ignored according to the current state and the distance from the last pulse received.

Accordingly, as shown at 210, the pulse filter 60 first waits for the next pulse from the edge detector 40. When the next pulse is received, the pulse filter receives a determination from the distance counter 50 as to the distance between that pulse and the preceding pulse. If the distance is greater than the 3cell threshold (which is 2.25 cells long), then a biphase coding violation has occurred and the start of a preamble is detected, as shown at 260. Subsequently, the holdoff period is set at the 2cell threshold (which is 1.5 cell lengths), as shown at 270, and transitions are ignored until the holdoff period has ended, as shown at 280, 290. All transitions for 1.5 cell lengths are therefore ignored. This is not problematic because, as explained above, the preamble does not contain audio data.

Once the holdoff period has expired, the pulse filter 60 waits for the next two pulses from the edge detector 40, as shown at 300. The distance between the next two transitions in both M and W preambles is one cell length, whereas the distance between the next two transitions in B preambles is 3cell lengths. Accordingly, if the distance detector 50 detects that the distance between the next two pulses is less than the 3cell threshold (that is, less than 2.25 cell lengths) an M or W preamble is detected, as shown at 310. Subsequently, the pulse filter 60 waits for the next pulse, as shown at 320, which will be occasioned by the transition between the end of the preamble and the next data bit cell. Accordingly, the end of the M or W preamble is detected 330. When this transition is detected, the holdoff period is set to the 2cell threshold 340 and further transitions are ignored until the holdoff period of 1.5 cell lengths has ended (see 240 and 250). The state machine then waits for the next pulse, as indicated at 210.

If a preamble is detected at 260 and the distance between the next two detected pulses (as shown at 300) is greater than the 3cell threshold, then a B preamble is detected at 350. In that case, the last pulse to have been detected will correspond to the transition between the end of the B preamble and the next data bit. The holdoff period is therefore set to the 2cell threshold 360 and further transitions are ignored until the holdoff period of 1.5 cell lengths has ended (see 240 and 250). The state machine then waits for the next pulse, as indicated at 210, which should correspond to a data bit.

If the end of the preamble has been previously detected, the next pulse after the end of the holdoff period should correspond to the transition between cells at the end of a data bit. Consequently, the distance between the last two detected pulses should not be greater than the 3cell threshold. Accordingly, if the pulse filter 60 detects that the distance between the two pulses is not greater than the 3cell threshold, a data bit is detected. This is indicated at 220 in FIG. 3. In that case, the holdoff period is set to the 2cell threshold (as shown at 230). At the same time, the pulse filter 60 determines whether the "transition direction" of the most recently detected transition in the biphase coded signal is the same as the "transition direction" of the previously detected transition. Thus, if two rising edges are detected, then a '1' is output. Similarly, if two falling edges are detected, then a '1' is again output. However, if a rising edge is detected followed by a falling edge, or a falling edge is detected followed by a rising edge, then a '0' is output. Decoding in this manner is possible since all transitions in the middle of '1' data bits have been ignored.

The state machine then waits until the 2cell holdoff period has expired (as shown at 240) before receiving the next pulse (as shown at 210).

Figure 4:
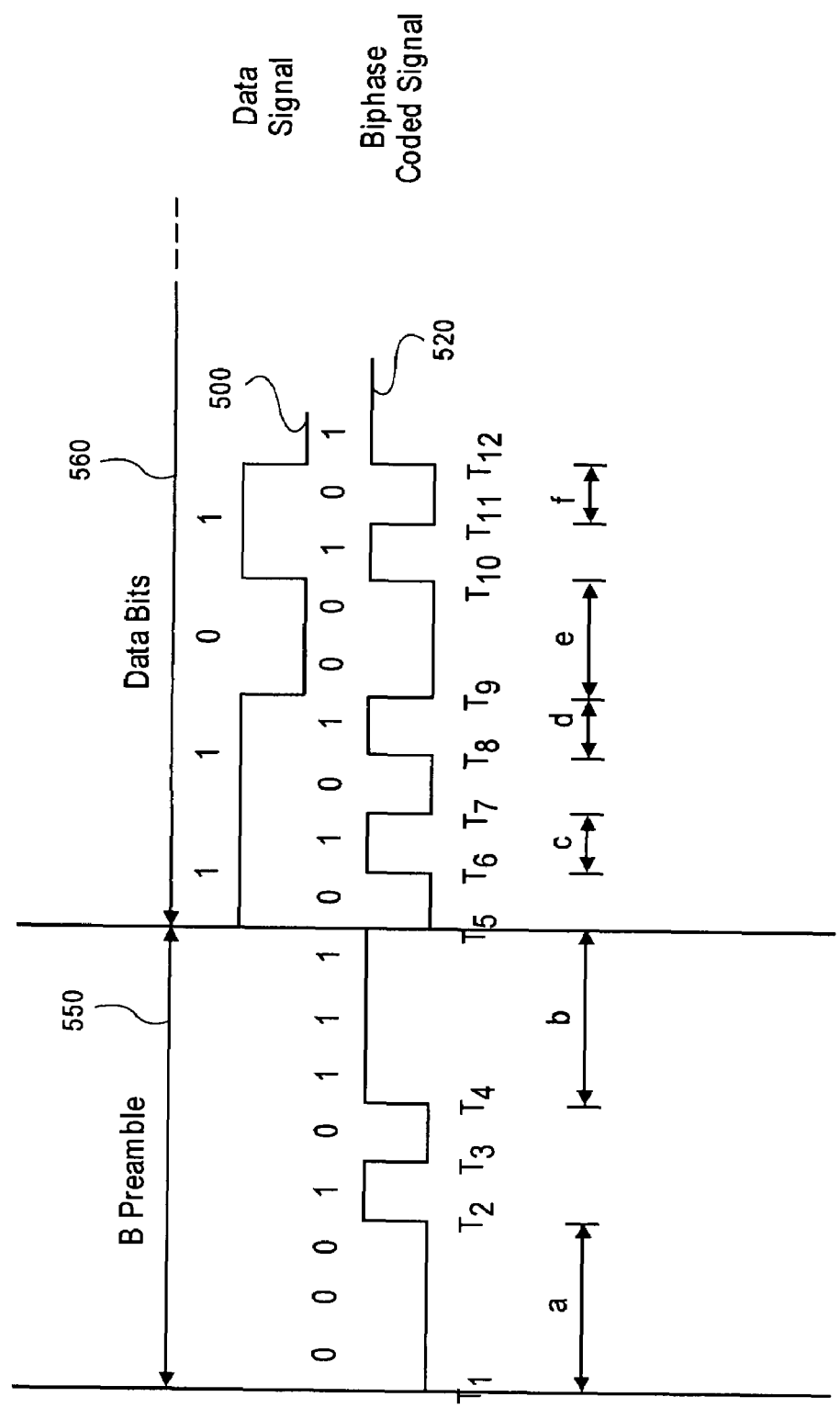
FIGS. 4, 5 and 6 illustrate the decoding of exemplary data streams according to embodiments of the present invention.
Figure 12:
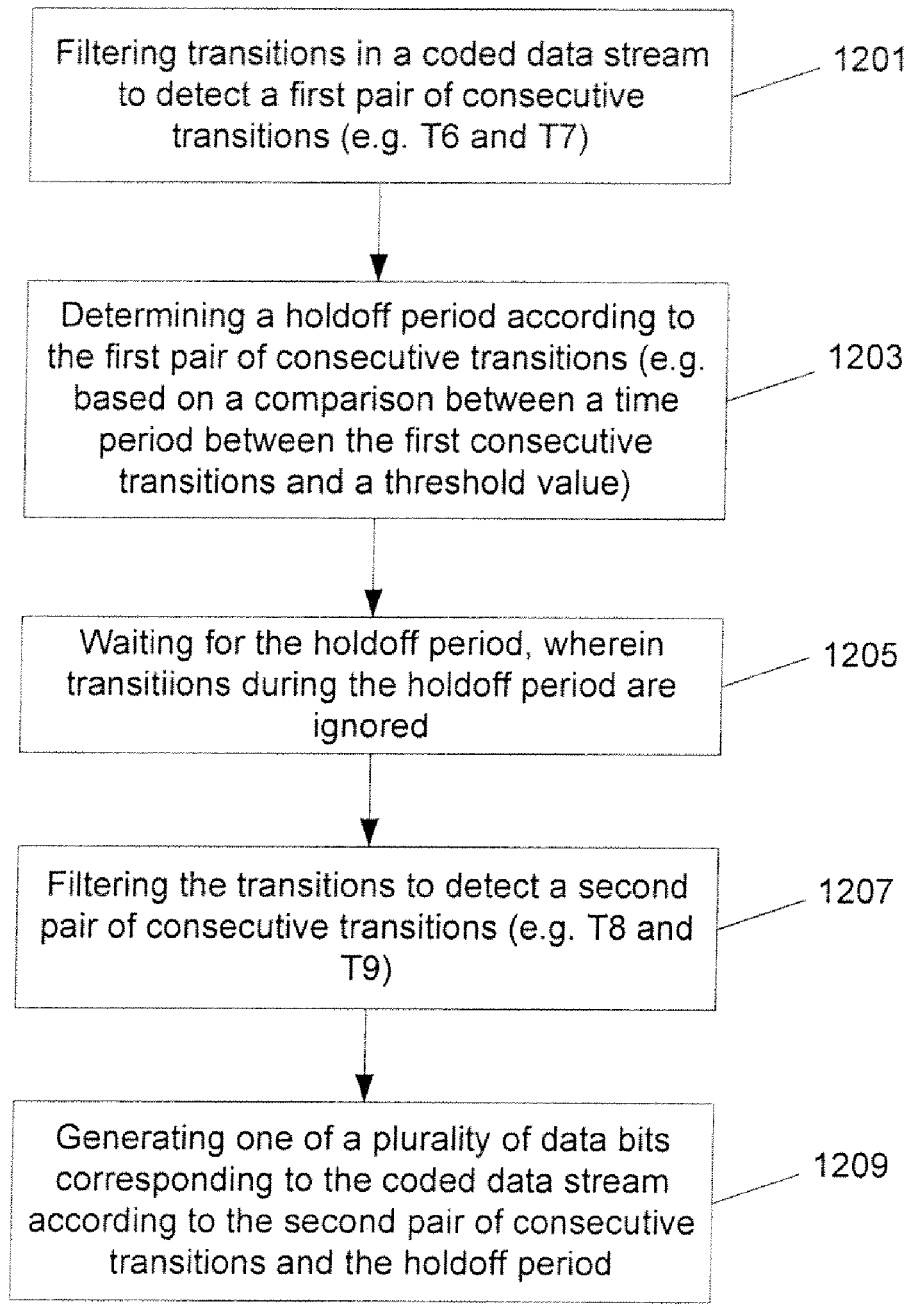
FIG. 12 shows a method according to one embodiment.

The decoding of an exemplary coded data stream 20 by the decoder 100 using the pulse filter 200 is shown in FIG. 4. and FIG. 12. Specifically, the figure shows a portion 500 of a data stream comprising a B preamble 550 and a series of uncoded data bits 560. Directly below data stream portion 500, the encoded data 520 is shown. Only the data bits 560 have been encoded using biphase coding. Thus, each encoded data bit comprises two cells. At least one of the two cells in each data bit transitions. Where there is a transition between adjacent cells, this is indicated $T_y$ below the cells. Thus, the edge detector will output a pulse at each location $T_y$.

The first distance between transitions that the decoder is able to detect is distance 'a' between transitions $T_1$ and $T_2$. Since (a>3cell threshold), a preamble is detected and the holdoff period is set at the 2cell threshold. This means that all transitions for the period corresponding to 1.5 cell lengths following $T_2$ are ignored. Hence, transition $T_3$ is ignored. Thus, the next two transitions to be considered by the pulse filter 60 are transitions $T_4$ and $T_5$. The distance between $T_5$ and the preceding transition $T_4$ is 'b'. Since (b>3cell threshold), the preamble is determined to be a B preamble. Accordingly, the holdoff period is again set at the 2cell threshold.

This means that all transitions for the period corresponding to 1.5 cell lengths following $T_5$ are ignored. Thus, transition $T_6$ is ignored by pulse filter 60, although not by distance counter 50. Thus, the next transition to be considered by the pulse filter 60 is transition $T_7$ 1201. The pulse filter 60 therefore obtains the distance between transition $T_7$ and the preceding transition from the distance counter 50. The distance between $T_7$ and the preceding transition $T_6$ is 'c'. Since (c<3cell threshold), a data bit is detected and the holdoff period is set at the 2cell threshold 1203. Moreover, since transitions $T_5$ and $T_7$ are both falling edges, the decoder outputs a data bit '1'.

Because the holdoff period is set at the 2cell threshold (which means that all transitions for the period corresponding to 1.5 cell lengths following $T_7$ are ignored 1205), transition $T_8$ is ignored. Thus, the next transition to be considered by the pulse filter 60 is transition $T_9$ 1207. The distance between $T_9$ and the preceding transition $T_8$ is 'd'. Since (d<3cell threshold), a data bit is detected and the holdoff period is set at the 2cell threshold. Moreover, since two falling edges are considered by the pulse filter 60, the decoder outputs a data bit '1' 1209.

Because the holdoff period is set at the 2cell threshold, all transitions for the period corresponding to 1.5 cell lengths following $T_9$ are ignored. In this case, there are no transitions in this holdoff period. The next transition to be considered by the pulse filter 60 is transition $T_{10}$. The distance between $T_{10}$ and the preceding transition $T_9$ is 'e'. Again, (e<3cell threshold), a data bit is detected and the holdoff period is set at the 2cell threshold. Moreover, since the pulse filter 60 considers a falling edge followed by a rising edge, the decoder outputs a data bit '0'.

Figure 5:
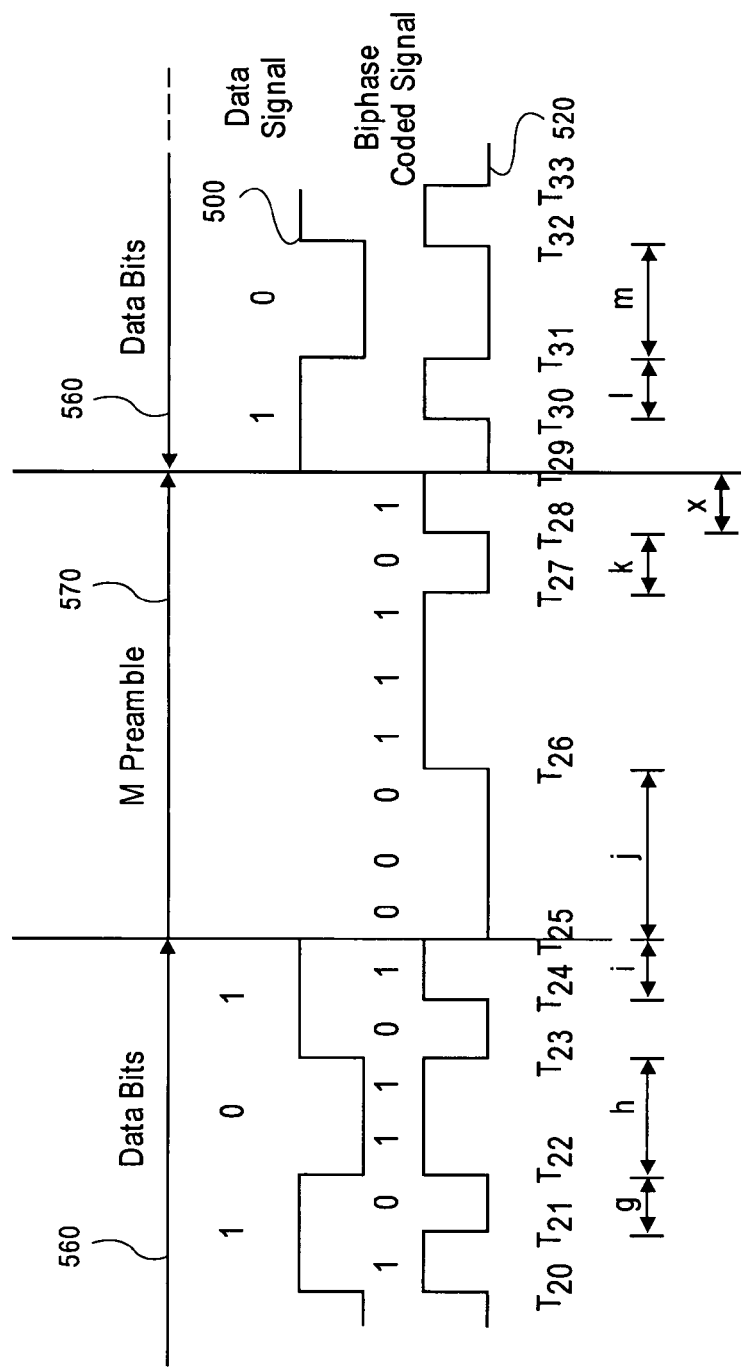

The decoder carries on detecting data bits until a further preamble is detected. This is illustrated in the portion of the data stream 520 shown in FIG. 5, which includes two regions of uncoded bits 560 that sandwich an M preamble 570. In common with FIG. 4, the pulse filter 60 will consider distances 'g', 'h' and 'i' in the initial portion of the data stream 560 and output bits '1', '0' and '1' respectively. Next, the pulse filter 60 will detect that the distance 'j' between transitions $T_{25}$ and $T_{26}$ is greater than the 3cell threshold and therefore detect a preamble. Subsequently, the holdoff period is set at the 2cell threshold so that all transitions for the following 1.5 cell lengths are ignored. In this case, no transitions occur within this holdoff period. Thus, the next two transitions detected at 300 in the state machine diagram of FIG. 3 are $T_{27}$ and $T_{28}$. The distance 'k' between the two is less than the 3cell threshold (k<3cell threshold), so an M or W preamble is detected.

Subsequently, the pulse filter 60 waits for the next pulse, which is generated for transition $T_{29}$. This transition corresponds with the end of the M preamble. The holdoff period is set at the 2cell threshold, which means that all transitions for the period corresponding to 1.5 cell lengths following $T_{29}$ are ignored by the pulse filter. Thus, transition $T_{30}$ is ignored. The next transition to be considered by the pulse filter 60 is therefore transition $T_{31}$. The distance between $T_{31}$ and the preceding transition $T_{30}$ is '1'. Since (1<3cell threshold), a data bit is detected and the holdoff period is set at the 2cell threshold. Moreover, since two falling edges are detected, the decoder outputs a data bit '1'. Again, the decoder carries on detecting data bits until a further preamble is detected.

Figure 6:
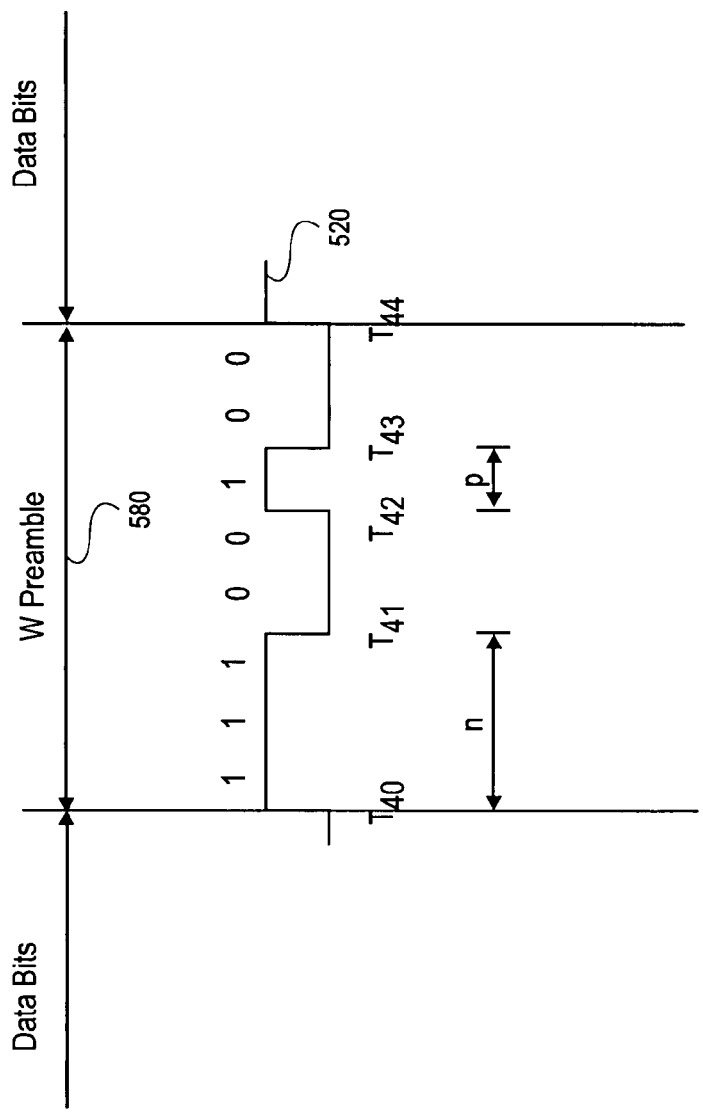

The detection of a W preamble is now explained with reference to FIG. 6. Again, the pulse filter detects a preamble at 260 in the state machine diagram of FIG. 3 since the distance 'n' between transitions $T_{40}$ and $T_{41}$ is three cells so (n>3cell threshold). Subsequently, the holdoff period is set at the 2cell threshold so that all transitions for the following 1.5 cell lengths are ignored. In this case, no transitions occur within this holdoff period. Thus, the next two transitions detected at 300 in the state machine diagram of FIG. 3 are $T_{42}$ and $T_{43}$. The distance 'p' between these two transitions is less than the 3cell threshold (p<3cell threshold), so an M or W preamble is detected.

Subsequently, the pulse filter 60 waits for the next pulse, at transition $T_{44}$, which corresponds with the end of the W preamble, and sets the holdoff period at the 2cell threshold. This means that all transitions for the period corresponding to 1.5 cell lengths following $T_{44}$ are ignored. Again, the decoder then detects data bits until a further preamble is detected.

Figure 7:
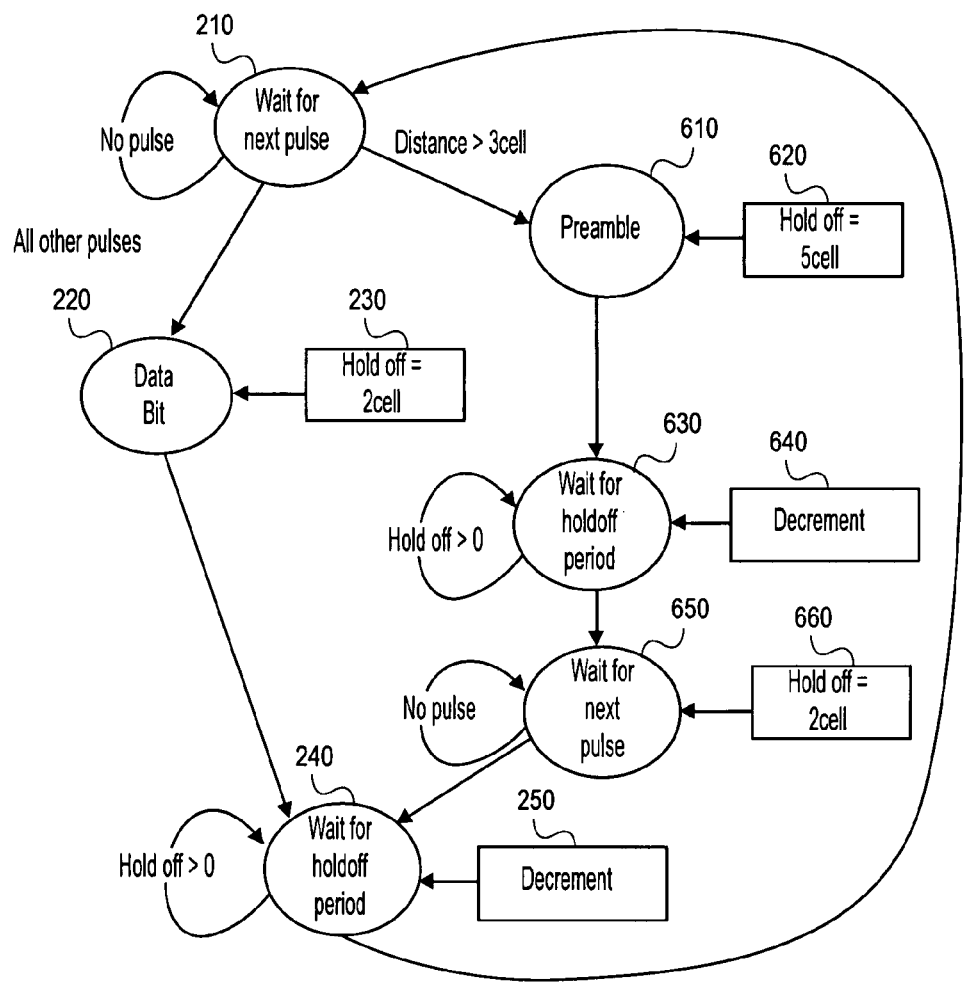
FIGS. 7, 8 and 9 are state machine diagrams illustrating other decoding methods and apparatuses according to embodiments of the present invention.

Of course, other implementations of the pulse filter can be contemplated. These may depend on the information required to be obtained from the decoded signal. For example, where biphase coding is used but it is not desired to distinguish between different kinds of preamble, then a pulse filter 60 implemented as a state machine 600 as shown in FIG. 7 could be used. In this implementation, wait for next pulse 210, detect data bit 220, set holdoff period 230, wait for holdoff period 240 and decrement 250 are the same as in FIG. 3. In addition, detect preamble 610 of FIG. 7 corresponds with detect preamble 260 in FIG. 3. Thus, if a gap between detected signals exceeds the 3cell threshold, a preamble is again detected.

However, in this instance it is not desired to distinguish between different types of preamble. Accordingly, once a preamble is detected, the holdoff period is set to the 5cell threshold, as shown at 620. The pulse filter then waits (as shown at 630), for example by decrementing a counter (as shown at 640), until the holdoff period has expired. The pulse filter 60 then waits for the next pulse (as shown at 650), which corresponds to the transition between the end of the preamble and the next data bit. The holdoff period is then set at the 2cell threshold (as shown at 660), before proceeding to wait for the holdoff period to expire (as shown at 240 and 250) and thence to wait for the next pulse (as shown at 210) as before.

The principle of this implementation of the pulse filter will now be described with reference to FIG. 4. The first distance between transitions that the decoder is able to detect is distance 'a' between transitions $T_1$ and $T_2$. Since (a>3cell threshold), a preamble is detected and the holdoff period is set at the 5cell threshold. This means that all transitions for the period corresponding to 4.5 cell lengths following $T_2$ are ignored.

Thus, transitions $T_3$ and $T_4$ are ignored. Thus, the next transition to be considered by the pulse filter 60 is transition $T_5$. The holdoff period is then set at the 2cell threshold again.

This means that all transitions for the period corresponding to 1.5 cell lengths following $T_5$ are ignored. Thus, transition $T_6$ is ignored and the next transition to be considered by the pulse filter 60 is transition $T_7$. The distance between $T_7$ and the preceding transition $T_6$ is 'c'. Since (c<3cell threshold), a data bit is detected and the holdoff period is set at the 2cell threshold. Moreover, since transitions $T_5$ and $T_7$ are both falling edges, the decoder outputs a data bit '1'. The decoder continues to decode the data stream in the same manner as before.

It will be clear that this implementation of the pulse filter operates on the M and W preambles in a similar way. In particular, all transitions between the code violation at the beginning of the preamble are ignored and the pulse filter is then set to detect data bits by skipping transitions occurring in the middle of those data bits.

Figure 8:
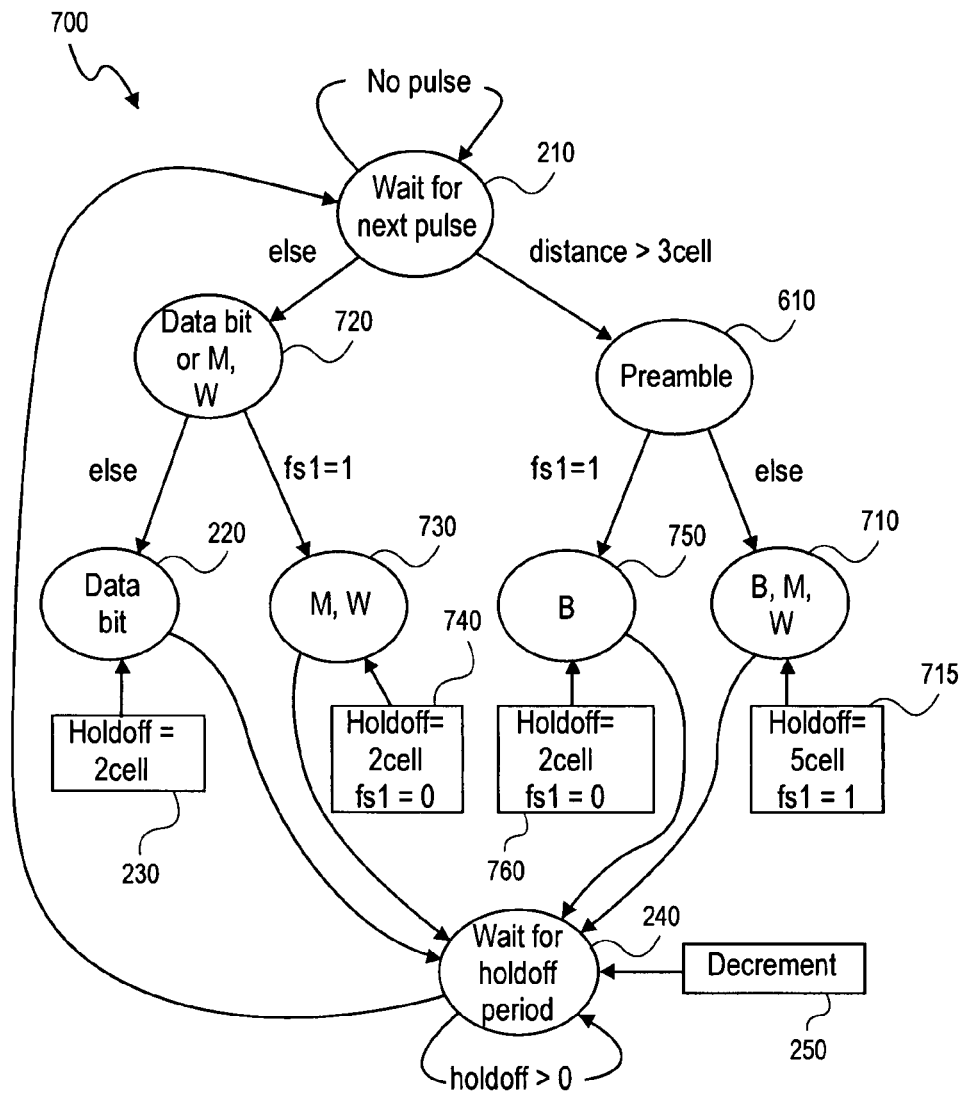

Another possible implementation of the pulse filter 60 is shown in FIG. 8. In common with the implementation shown in FIG. 3, this implementation is able to distinguish between the B and M or W preambles. However, it uses a flag (fs1) to assist in distinguishing between preambles. At the start of operation, the flag is set at fs1=0.

In common with the implementations described above, if the period between adjacent pulses is detected as being greater than the 3cell threshold, a preamble is detected at 610. If the test fs1=1 is false, then the state machine determines that the preamble can be any one of a B, M or W pulse (see 710). At the same time, the holdoff period is set to the 5cell threshold (see 715) and the flag is set fs1=1. The pulse machine then proceeds to wait for the holdoff period to expire (see 240 and 250) before again waiting for the next pulse (see 210).

On the other hand, if fs1=1 when the preamble is detected at 610, then it is determined that the preamble is a B preamble. The holdoff period is then set to the 2cell threshold and the flag is set fs1=0, before again proceeding to wait for the holdoff period to expire (see 240 and 250) before waiting for the next pulse (see 210).

If the period between adjacent cells is less than the 3cell threshold, then the pulse filter 700 determines at 720 either that a data bit has been detected or an M or W preamble has been detected, depending on whether the flag is set fs1=1 or not. If an M or W preamble is detected (see 730), the holdoff period is then set to the 2cell threshold and the flag is set fs1=0 (see 734), before again proceeding to wait for the holdoff period to expire (see 240 and 250) before waiting for the next pulse (see 210).

On the other hand, if the test fs1=1 is false when the data bit or M or W preamble is detected at 720, then it is determined that a bit is detected (see 220). The holdoff period is then set to the 2cell threshold (see 230), before again proceeding to wait for the holdoff period to expire (see 240 and 250) and to wait for the next pulse (see 210).

The principle of this implementation of the pulse filter will now be explained with reference to FIG. 4. The first distance between transitions that the decoder is able to detect is distance 'a' between transitions $T_1$ and $T_2$. Since (a>3cell threshold), a preamble is detected (see 610). Since the flag is set fs1=0, it is determined that the preamble could be any one of a B, M or W preamble (see 710). The flag is then set fs1=1 and the holdoff period is set at the 5cell threshold (see 715). This means that all transitions for the period corresponding to 4.5 cell lengths following $T_2$ are ignored. Thus, transitions $T_3$ and $T_4$ are ignored.

Thus, the next transition to be considered by the pulse filter 60 is transition $T_5$. The distance between $T_5$ and the preceding transition $T_4$ is 'b'. Since (b>3cell threshold) and the flag is set fs1=1, the preamble is determined to be a B preamble (see 610 and 750). Accordingly, the holdoff period is again set at the 2cell threshold and the flag is reset fs1=0 (see 760).

This means that all transitions for the period corresponding to 1.5 cell lengths following $T_5$ are ignored. Thus, transition $T_6$ is ignored by pulse filter 60. Thus, the next transition to be considered by the pulse filter 60 is transition $T_7$. The distance between $T_7$ and the preceding transition $T_6$ is 'c'. Since (c<3cell threshold), the pulse filter 700 determines that either a data bit or an M or W preamble is detected (see 720). Since fs1=0, a data bit is detected (see 220) and the holdoff period is set at the 2cell threshold (see 230). Moreover, since transitions $T_5$ and $T_7$ are both falling edges, the decoder outputs a data bit '1'.

The decoder carries on detecting data bits until a further preamble is detected. This is illustrated in the portion of the data stream 520 shown in FIG. 5. In common with FIG. 4, the pulse filter 60 will consider distances 'g', 'h' and 'i' in the initial portion of the data stream 560 and output bits '1', '0' and '1' respectively. Next, the decoder will detect that the distance 'j' between transitions $T_{25}$ and $T_{26}$ is greater than the 3cell threshold and therefore detect a preamble (see 610). Since the flag is set fs1=0, it is determined that the preamble could be any one of a B, M or W preamble (see 710). The flag is then set fs1=1 and the holdoff period is set at the 5cell threshold (see 715). This means that all transitions for the period corresponding to 4.5 cell lengths following $T_{26}$ are ignored. Thus, transitions $T_{27}$ and $T_{28}$ are ignored.

Thus, the next transition to be considered by the pulse filter 700 at state 210 is transition $T_{29}$. The distance between $T_{29}$ and the preceding transition $T_{28}$ is 'x'. Since (x<3cell threshold), the pulse filter 700 determines that either a data bit or an M or W preamble is detected (see 720). Since fs1=1, the decoder determines that the preamble is an M or W preamble (see 730). Subsequently, the holdoff period is set at the 2cell threshold and the flag is reset fs1=0 (see 740). The decoder then proceeds to detect data bits as normal. It will be clear that the pulse filter 700 operates in a similar fashion on the W preamble shown in FIG. 6.

Figure 9:
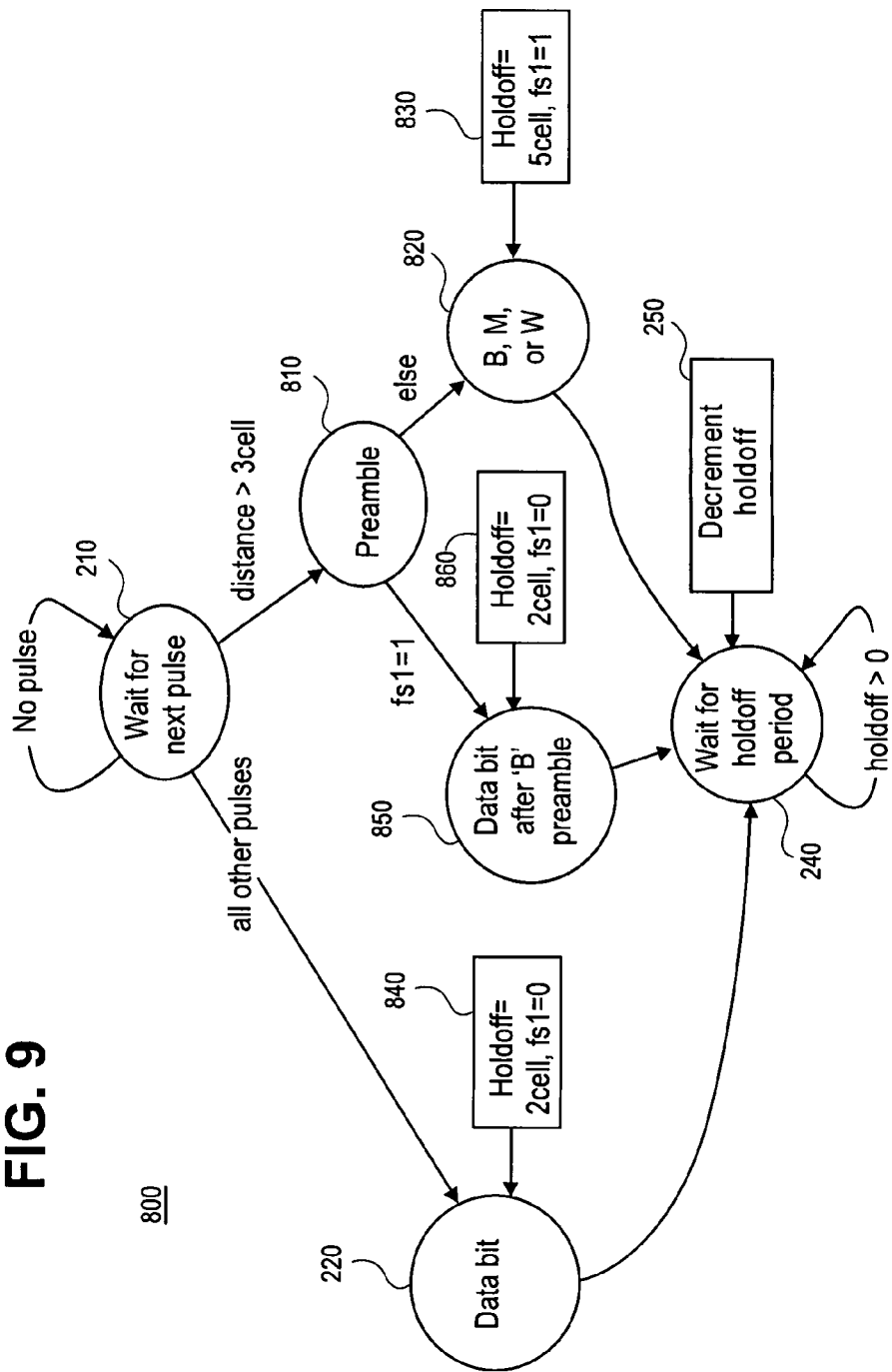

Although the implementations of the pulse filter 60 shown in FIGS. 3, 7 and 8 are fully operational, the preferred and more efficient implementation is shown in FIG. 9. In common with the implementations described above, this implementation is able to distinguish between the B and M or W preambles. Again, a flag (fs1) is used to distinguish between B preambles on one hand and M or W preambles on the other. At the start of operation, this flag is set at fs1=0.

In common with the previous implementation, if the period between adjacent pulses is detected as being greater than the 3cell threshold, the existence of a preamble is detected at 810. If the test fs1=1 is false, then the state machine determines that the preamble can be any one of a B, M or W pulse (see 820). At the same time, the holdoff period is set to the 5cell threshold and the flag is set fs1=1 (see 830). The pulse machine then proceeds to wait for the holdoff period to expire (see 240 and 250) before again waiting for the next pulse (see 210).

On the other hand, if fs1=1 when the preamble is detected at 810, then it is determined that the preamble is a B preamble and a data bit is detected (see 850). The holdoff period is then set to the 2cell threshold and the flag is set fs1=0 (see 860), before again proceeding to wait for the holdoff period to expire (see 240 and 250) and to wait for the next pulse (see 210).

If the period between adjacent cells is less than the 3cell threshold, then the pulse filter 800 determines at 220 that a bit is detected. The holdoff period is then set to the 2cell threshold and the flag is set fs1=0 (see 840), before again proceeding to wait for the holdoff period to expire (see 240 and 250) and to wait for the next pulse (see 210).

The principle of this implementation of the pulse filter will now be explained with reference to FIG. 4. The first distance between transitions that the decoder is able to detect is distance 'a' between transitions $T_1$ and $T_2$. Since (a>3cell threshold), a preamble is detected (see 810). Since the flag is set fs1=0, it is determined that the preamble could be any one of a B, M or W preamble (see 820). The flag is then set fs1=1 and the holdoff period is set at the 5cell threshold (see 830). This means that all transitions for the period corresponding to 4.5 cell lengths following $T_2$ are ignored. Thus, transitions $T_3$ and $T_4$ are ignored.

Thus, the next transition to be considered by the pulse filter 60 is transition $T_5$. The distance between $T_5$ and the preceding transition $T_4$ is 'b'. Since (b>3cell threshold) and the flag is set fs1=1, the preamble is determined to be a B preamble (see 810 and 850). In addition, the pulse filter outputs a spurious data bit at the time of determining that the preamble is a B preamble. This spurious bit does not correspond with any of the data bits included in the original data signal 500 before biphase coding. The holdoff period is again set at the 2cell threshold and the flag is reset fs1=0 (see 860).

This means that all transitions for the period corresponding to 1.5 cell lengths following $T_5$ are ignored. Thus, transition $T_6$ is ignored by pulse filter 60. Thus, the next transition to be considered by the pulse filter 60 is transition $T_7$. The distance between $T_7$ and the preceding transition $T_6$ is 'c'. Since (c<3cell threshold), a data bit is detected (see 220) and the holdoff period is set at the 2cell threshold (see 230). Again, the flag is set fs1=0. Moreover, since transitions $T_5$ and $T_7$ are both falling edges, the decoder outputs a data bit '1'.

The decoder carries on detecting data bits until a further preamble is detected. This is illustrated in the portion of the data stream 520 shown in FIG. 5. In common with FIG. 4, the pulse filter 60 will consider distances 'g', 'h' and 'i' in the initial portion of the data stream 560 and output bits '1', '0' and '1' respectively. Next, the decoder will detect that the distance 'j' between transitions $T_{25}$ and $T_{26}$ is greater than the 3cell threshold and therefore detect a preamble (see 810). Since the flag is set fs1=0, it is determined that the preamble could be any one of a B, M or W preamble (see 820). The flag is then set fs1=1 and the holdoff period is set at the 5cell threshold (see 830). This means that all transitions for the period corresponding to 4.5 cell lengths following $T_{26}$ are ignored. Thus, transitions $T_{27}$ and $T_{28}$ are ignored.

Thus, the next transition to be considered by the pulse filter 800 at state 210 is transition $T_{29}$. The distance between $T_{29}$ and the preceding transition $T_{28}$ is 'x'. Since (x<3cell threshold), the pulse filter 800 detects a data bit and the preamble is not determined to be a B preamble. However, this data bit is a spurious data bit and does not correspond with any of the data bits included in the original data signal 500 before biphase coding. Subsequently, the holdoff period is set at the 2cell threshold and the flag is reset fs1=0 (see 840). The decoder then proceeds to detect data bits as normal. It will be clear that the pulse filter 800 operates in a similar fashion on the W preamble shown in FIG. 6.

Accordingly, with this embodiment, the decoder outputs spurious data bits after each B, M and W preamble has been detected. However, since the sequencing of preambles and decoded data bits is known, it is a comparatively simple matter to remove these spurious data bits from the decoded data stream.

It will be obvious to those skilled in the art that other implementations of the pulse filter can be used to obtain the desired results. Similarly, other ways of implementing the pulse filter will be readily apparent to persons skilled in the art without the exercise of inventive skill. For example, it would be possible to implement the pulse filter so that it is further capable of distinguishing between M and W preambles based on their different characteristics if desired. For example, it would be possible to distinguish M and W preambles based on the difference between the distance between transitions $T_{26}$ and $T_{27}$ in FIG. 5 on one hand and the distance between transitions $T_{41}$ and $T_{42}$ in FIG. 6 on the other.

In addition, if the pulse filter is used for decoding a data stream that has been encoded other than by biphase coding, then it will be a relatively simple matter to redesign the pulse filter so that it is functional for the other coding system.

In any event, the pulse filter 60 is able to output a fully decoded stream of digital audio or other data without the use of a PLL. Instead, the decoder 100 uses a free running clock generated by a stand alone digital clock generator 10. Moreover, since the first and last transitions sensed for all preambles always occur at the same place, the decoder (specifically, the pulse filter 60) is able to provide a consistent synchronisation signal 'sync' to indicate the beginning of an IEC 60958 block (where a B preamble is detected) or frame or subframe (where an M or W preamble is detected).

It should be noted that in the IEC 60958 standard using two channels, data for the two channels is interleaved. Thus, subframes for channel A (indicated by preceding B and M preambles) are interleaved with subframes for channel B (indicated by preceding W preambles). Accordingly, once a B preamble has been detected, it is a simple matter of determining whether a decoded subframe relates to channel A or channel B simply by toggling between the channels as subframes are decoded.

Figure 10:
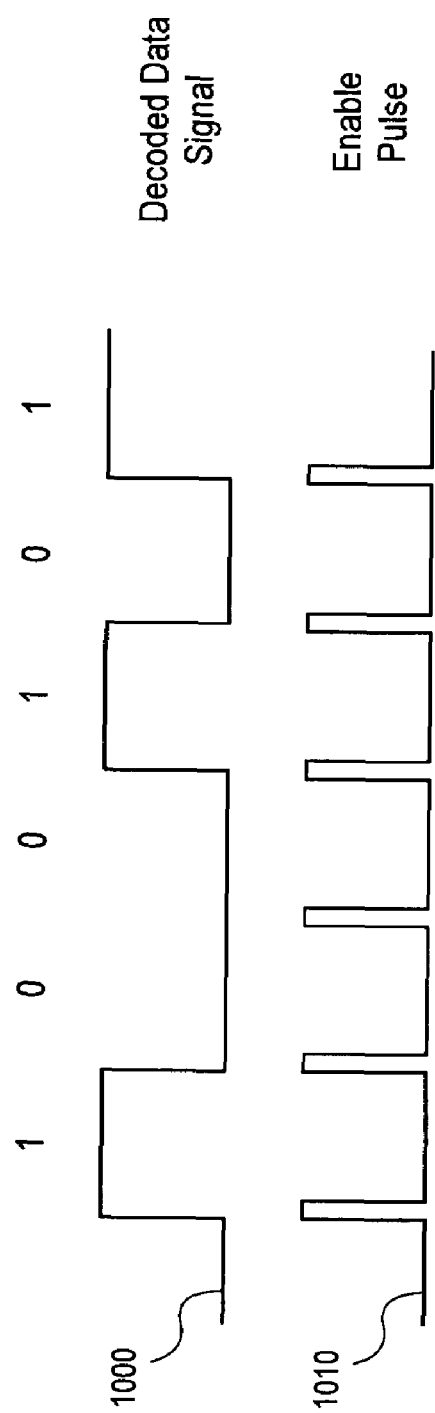
FIG. 10 is an illustration of an enable signal output by the apparatus of the present invention.

Moreover, the decoder 100 is able to output an enable pulse indicating that the data signal is valid. For example, the decoder is able to output an enable signal as shown in FIG. 10. Specifically, FIG. 10 shows a decoded data signal 1000 comprising the data bits 100101. The enable signal 1010 includes a short pulse at the commencement of each data bit. Typically, the enable signal will be provided using the free running clock that is generated by the clock generator 10 and drives the sampler 30, the distance counter 50 and the pulse filter 60. Typically, this clock will run at 96 MHz and the width of the enable pulse will be a single clock cycle, to allow a sufficiently short enable pulse.

Consequently, the decoder 100 of the present invention provides a fully digital decoding solution, which is suitable for implementation with virtually any digital technology, including ASICs, gate arrays and FPGAs.

Moreover, no PLL is required to decode the digital stream. Accordingly, where required, the data clock can be recovered after decoding and it is therefore possible to lock on to the broadest range of clock frequencies.

A further advantage is that the sampling frequency recovery can be isolated from the data stream decoding. Thus, audio clock recovery and its jitter characteristics can be optimised without cross effects due to data encoding.

In addition, the clock requirements of the clock generator 10 are relaxed. All that is required is a clock for sampling the input data stream fast enough that all transitions in the data stream can be detected, different pulse widths can be detected with some degree of safety margin and the widths of different thresholds can be calculated sufficiently accurately from dmax. It is thought that at least 4×128 fs=512 fs will generally be required, although a still faster clock would help to improve the behaviour of the decoder where the incoming IEC 60958 signal already jitters. However, the jitter characteristics and precise frequency of the clock are not important.

As noted above, the output of the pulse filter is the fully decoded, serial, digital audio data stream. In typical set ups, the audio clock needs to be recovered in order to process the data without resampling.

The audio clock could be recovered using a conventional analogue or digital PLL. However, such arrangements for recovering the audio clock are liable to present the same difficulties as set out above in respect of decoding the coded data stream.

Figure 11:
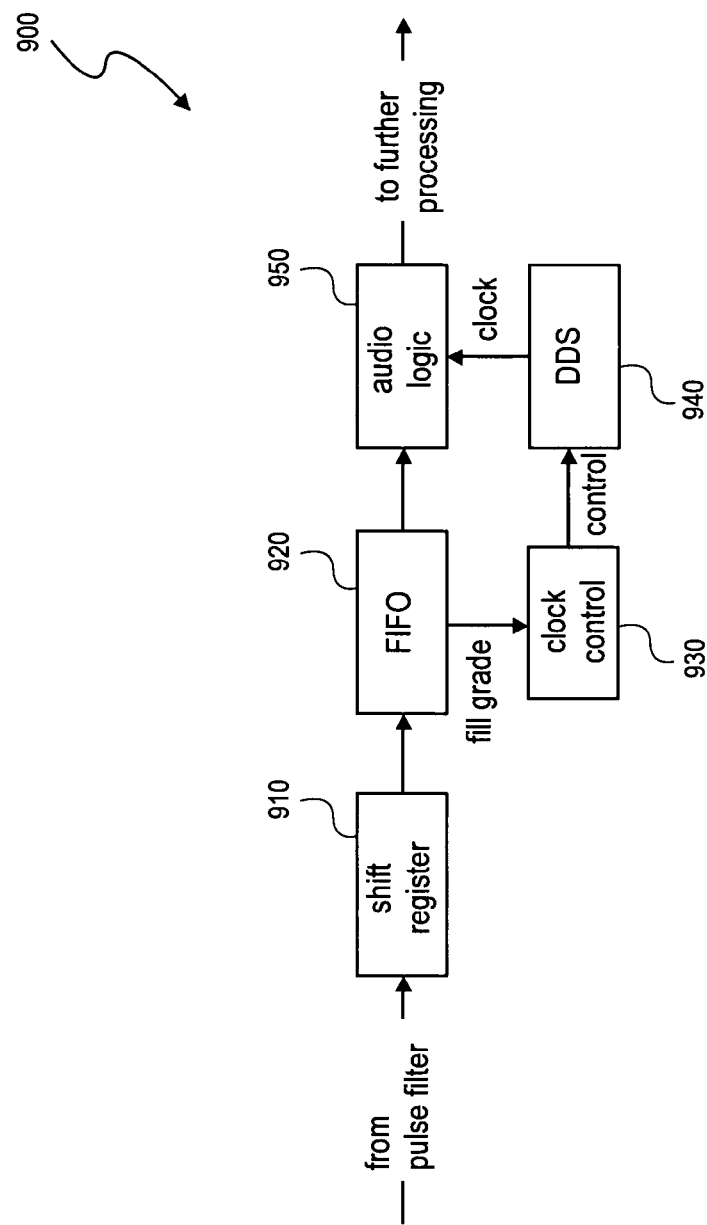
FIG. 11 is a schematic illustration of a clock recovery apparatus according to an embodiment of the present invention.

Accordingly, the present invention further provides an audio clock recovery arrangement, one embodiment of which is shown in FIG. 11. In this embodiment, the audio clock recovery arrangement 900 comprises a shift register 910, a FIFO 920, a clock control unit 930 and a direct digital synthesis (DDS) unit 940. The DDS unit is a programmable clock that operates by digitally generating a frequency-agile signal from an accurate reference clock. In this embodiment, the DDS generates the audio clock.

The shift register 910 is used to create a parallel word, for example for every IEC 60958 (or other) subframe, which is then transferred to the FIFO 920. In other words, as each of the data bits in a subframe or word is received by the shift register 910, it is stored until all the bits in the subframe or word have been received. Once all the bits have been received, they are sent in parallel—that is, at the same time—to the FIFO 920.

It should be noted that the shift register 910 can be used to discard any spurious bits output by the decoder, for example, the spurious bits output by the embodiment of the decoder shown in FIG. 9 after respective preambles have been detected.

The FIFO 920 is used to store each parallel word for a limited time before it is output to the audio logic block 950 for processing. Thus, several parallel words are stored in the FIFO 920 at any one time before they are sent, successively and in order, to the audio logic block 950.

The clock control 930 is provided with a signal indicative of the fill grade of the FIFO 920—that is, with a measure of how full the FIFO is. The fill grade is used by the clock control 930 to control the frequency of the clock generated by the DDS 940 and hence the speed at which words are used by the audio logic 950. If the clock control 930 detects that the FIFO 920 is beginning to fill up, this is an indication that clock generated by the DDS 940 is too slow compared with the rate of data input to the FIFO. The clock control 930 therefore causes the frequency of the clock to be increased. If, on the other hand, the clock control 930 detects that the FIFO 920 is beginning to empty, this is an indication that clock generated by the DDS 940 is comparatively too fast. The clock control 930 therefore causes the frequency of the clock to be reduced.

The required depth of the FIFO 920 is dependent on the jitter requirements of the recovered audio clock. If the jitter requirements of the audio clock are high, then a fast clock is required to reproduce the audio clock. The main reason for this is that when creating a clock by fully digital circuitry, the only event that can cause the audio clock to toggle is a clock edge from the clock generator. In the instant invention, both edges of a 96 MHz clock could be used to create a peak jitter of 5.2 ns.

Of course, the required depth of the FIFO 920 depends on the difference in the data rates of the audio logic and the decoded incoming IEC 60958 signal. Ideally, the data rate of the audio logic is stable. However, the incoming IEC 60958 signal will itself invariably jitter and have a less stable data rate. In addition, the more stable the audio clock, the less its frequency is altered by the FIFO fill grade and the larger the FIFO 920 needs to be. In other words, the FIFO 320 needs to be able to store enough words at one time so that it is always sufficiently full to allow the audio clock to operate stably. However, a FIFO depth of as little as 16 words should be sufficient for most applications.

The arrangement shown in FIG. 11 can also be used for a large number of applications other than the recovery of an audio clock. Of course, the logic 950 need not be audio logic. For example, the input to the shift register 910 could be a digital data stream from a microprocessor bus and relate to any of a number of processing applications. Another example would be a data stream from a FireWire application or a data stream from a Bluetooth device. In such data streams, there are variations in the average and peak data rates. With the use of FireWire for audio applications, the average data rate necessarily equals the audio data rate. However, the peak data rate on FireWire is 400 Mbps, which is about 250 times the data rate of a standard 16 bit stereo stream. Nonetheless, the arrangement shown in FIG. 11 could accept the FireWire data in the FIFO 920 and still provide a stable clock for use by the logic. Consequently, the arrangement shown in FIG. 9 is effective for re-clocking data streams received at a varied frequency.

In effect, the arrangement shown in FIG. 9 can act as an elastic buffer for any data signal that passes between different clock domains.

The foregoing description has been given by way of example only and it will be appreciated by a person skilled in the art that modifications can be made without departing from the spirit and scope of the present invention. For example, the present invention need not be applied only to biphase coded data streams. Rather, it can be applied to other coded data streams, such as triphase coded data streams or other coding systems. The only modifications would be to determine alternative, suitable thresholds and to reconfigure the pulse filter so that its functionality matches the coded data stream and it provides the required output. In addition, the present invention is not limited to audio or video data or to the IEC 60958 or EIAJ CP-340 1987-9 standards, including the AES-EBU and SPDIF implementations. Indeed, aspects of the present invention are applicable to any data stream. Thus, the number of subframes in a block and the number of data bits in a subframe used in any particular scheme are unimportant to the present invention.

The invention claimed is:

1. A method for decoding a coded data stream of a data stream including a plurality of data bits and a plurality of preamble bits, the method comprising:
    filtering, as part of the decoding of the coded data stream, from transitions in the coded data stream for at least a first pair of consecutive transitions, the coded data stream including the plurality of data bits;
    determining a holdoff period according to the first pair of consecutive transitions;
    filtering from the transitions in the coded data stream for a second pair of consecutive transition; and
    generating one of the plurality of data bits according to the second pair of consecutive transitions and the holdoff period.

2. The method of claim 1, wherein the determination of the holdoff period comprises:

comparing a first time period between the first pair of consecutive transitions with a threshold value.

3. The method of claim 2, wherein the method of decoding further comprises:
if the first time period between the first pair of consecutive transitions is less than the threshold value, generating a data bit preceding the one of the plurality of data bits according to the first pair of consecutive transitions.

4. The method of claim 2, wherein a second time period between the second pair of consecutive transitions is less than the threshold value.

5. The method of claim 2, wherein the first pair of consecutive transitions and the second pair of consecutive transitions include a common transition.

6. The method of claim 2, further comprising:
if the first time period is greater than the threshold value, selecting a number of consecutive transitions subsequent to the first pair of consecutive transitions, wherein the number of consecutive transitions and the second pair of consecutive transitions share one common transition.

7. The method of claim 2, further comprising:
if the first time period is greater than the threshold value, selecting a third pair of consecutive transitions subsequent to the first pair of consecutive transitions; and
identifying one of the plurality of preamble bits according to the third pair of consecutive transitions.

8. The method of claim 7, wherein the second consecutive transitions and the third consecutive transitions share a common transition.

9. The method of claim 7, wherein each of the transitions includes a transition direction, and wherein the one of the plurality of data bits is determined according to whether transition directions of one of the first pair of consecutive transitions and one of the second pair of consecutive transitions are the same.

10. The method of claim 7, wherein the plurality of preamble bits has a pattern, and wherein the method further comprising:
comparing a third time period between the third pair of transitions with the threshold value; and
determining the pattern of the plurality of preamble bits according to the comparison of the third time period and the threshold value.

11. The method of claim 2, wherein the threshold value is determined based on a maximum time period between transitions in the coded data stream.

12. An apparatus for decoding a coded data stream of a data stream including a plurality of data bits and a plurality of preamble bits, the apparatus comprising;
a detector to detect transitions in the coded data stream;
a timer configured to determine a time between adjacent transitions; and
a filter coupled to detector and the timer, wherein the filter is configured to
filter, as part of the decoding of the coded data stream, from transitions in the coded data stream for at least a first pair of consecutive transitions, the coded data stream including the plurality of data bits,
determine a holdoff period according to the first pair of consecutive transitions,
filter from the transitions in the coded data stream for a second air of consecutive transitions, and
generate one of the plurality of data bits according to the second pair of consecutive transitions and the holdoff period.

13. The apparatus of claim 12, wherein the filter to determine the holdoff period is arranged to:
compare a first time period between the first pair of consecutive transitions with a threshold value.

14. The apparatus of claim 13, wherein the filter is arranged to generate a data bit preceding the one of the plurality of data bits according to the first pair of consecutive transitions if the first time period between the first pair of consecutive transitions is less than the threshold value.

15. The apparatus of claim 13, wherein a second time period between the second pair of consecutive transitions is less than the threshold value.

16. The apparatus of claim 13, wherein the first pair of consecutive transitions and the second pair of consecutive transitions include a common transition.

17. The apparatus of claim 13, wherein the filter is arranged to filter from the transitions for a number of consecutive transitions subsequent to the first pair of consecutive transitions if the first time period is greater than the threshold value, wherein the number of consecutive transitions and the second pair of consecutive transitions share one common transition.

18. The apparatus of claim 13, wherein the filter is arranged to
filter from the transitions for a third pair of consecutive transitions subsequent to the first pair of consecutive transitions if the first time period is greater than the threshold value, and
identify one of the plurality of preamble bits according to the third pair of consecutive transitions.

19. The apparatus of claim 18, wherein the second consecutive transitions and the third consecutive transitions share a common transition.

20. The apparatus of claim 18, wherein each of the transitions includes a transition direction, and wherein the one of the plurality of data bits is determined according to whether transition directions of one of the first pair of consecutive transitions and one of the second pair of consecutive transitions are the same.

21. The apparatus of claim 18, wherein the plurality of preamble bits has a pattern, and wherein the filter is arranged to
compare a third time period between the third pair of transitions with the threshold value, and
determine the pattern of the plurality of preamble bits according to the comparison of the third time period and the threshold value.

22. The apparatus of claim 13, further comprising a logic for determining a maximum time period in the coded data stream without a transition, wherein the threshold value is determined based on the maximum time period.

* * * * *